US012013109B1

(12) United States Patent
Li

(10) Patent No.: US 12,013,109 B1
(45) Date of Patent: Jun. 18, 2024

(54) RAINBOW PROJECTION LAMP

(71) Applicant: LONVIS TECHNOLOGY (SHENZHEN) CO., LTD., Guangdong (CN)

(72) Inventor: Xuequan Li, Guangdong (CN)

(73) Assignee: LONVIS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/132,829

(22) Filed: Apr. 10, 2023

(30) Foreign Application Priority Data

Jan. 10, 2023 (CN) ......................... 202320068800.1

(51) Int. Cl.

| | |
|---|---|
| ***F21V 3/02*** | (2006.01) |
| ***F21V 23/00*** | (2015.01) |
| ***F21V 23/04*** | (2006.01) |
| *F21Y 113/17* | (2016.01) |
| *F21Y 115/10* | (2016.01) |

(52) U.S. Cl.
CPC .............. *F21V 3/02* (2013.01); *F21V 23/005* (2013.01); *F21V 23/04* (2013.01); *F21Y 2113/17* (2016.08); *F21Y 2115/10* (2016.08)

(58) Field of Classification Search
CPC ......... F21V 7/0066; F21V 11/08; F21V 11/12
See application file for complete search history.

(56) References Cited

U.S. PATENT DOCUMENTS

| | | | | |
|---|---|---|---|---|
| 2004/0102247 | A1* | 5/2004 | Smoot | G07F 17/32 463/36 |
| 2012/0299480 | A1* | 11/2012 | Peting | H05B 47/185 315/185 R |
| 2020/0236759 | A1* | 7/2020 | Jurik | F21V 29/51 |
| 2020/0309334 | A1* | 10/2020 | Quadri | F21S 10/007 |
| 2023/0276554 | A1* | 8/2023 | Jiang | F21V 21/30 362/280 |

* cited by examiner

*Primary Examiner* — Eric T Eide

(57) ABSTRACT

The present disclosure provides a rainbow projection lamp, which includes a light-permeable plate, at least one hybrid/monochromatic light source and a circuit board; wherein, at least one arc-shaped through-hole is arranged on the light-permeable plate, and the light source is arranged at one side of the arc-shaped through-hole; and, the light source is electrically connected with the circuit board, and a light emitted by the light source passes through the arc-shaped through-hole and then transmits a rainbow projection. In the present disclosure, since wavelengths of different lights are different, and the lights will be diffracted when they pass through a slit, the positions of the diffracted lights will be different when the lights pass through the arc-shaped through-hole of the light-permeable plate according to the present disclosure.

9 Claims, 5 Drawing Sheets

RAINBOW PROJECTION LAMP

CROSS-REFERENCE TO RELATED APPLICATION

This application claims priority from the Chinese patent application 202320068800.1 filed Jan. 10, 2023, the content of which is incorporated herein in the entirety by reference.

TECHNICAL FIELD

The present disclosure relates to the field of a projection lamp, and in particular to a rainbow projection lamp.

BACKGROUND

With the improvement of people's living standard, a projection lamp with different functions is increasingly favored by people, and types of the projection lamp include but are not limited to starry lamps, meteor lamps and rainbow lamps. In this case, most of the existing rainbow lamps are projection lamps composed of devices including lenses, filter components and multiple light source layouts. The existing rainbow lamp has disadvantages of complex structure, large volume of lamps and high production cost, and the projected rainbow effect cannot meet people's viewing needs.

SUMMARY

Aiming at the shortcomings of the prior art, the present disclosure provides a rainbow projection lamp, which can mix light spots formed by light sources with different colors into rainbow color, and has a simple structure and low manufacturing costs.

The technical solution of the present disclosure is implemented as follows:

A rainbow projection lamp includes a light-permeable plate, at least one hybrid/monochromatic light source and a circuit board; wherein, at least one arc-shaped through-hole is arranged on the light-permeable plate, and the light source is arranged at one side of the arc-shaped through-hole; and, the light source is electrically connected with the circuit board, and a light emitted by the light source passes through the arc-shaped through-hole and then transmits a rainbow projection.

Preferably, the rainbow projection lamp further includes a light shielding plate; wherein, the light shielding plate is connected with the light-permeable plate to constitute a first cavity, and the light source is configured within the first cavity.

Preferably, the quantity of the light source is one, which is a hybrid light source formed by mixing different colors.

Preferably, the quantity of the light sources are multiple, which are monochromatic light sources with different colors or hybrid light sources formed by mixing different colors.

Preferably, the light source is an LED lamp bead.

Preferably, the quantity of the arc-shaped through-hole is one, and the light source is located at a bottom where the arc-shaped through-hole is located.

Preferably, the quantity of the arc-shaped through-holes are multiple, a plurality of light blocking strips for separating each light source are configured within the first cavity; the plurality of light blocking strips are configured to separate the first cavity into a plurality of second cavities, and the arc-shaped through-holes are arranged on the light-permeable plate corresponding to each of the second cavities, respectively.

Preferably, the rainbow projection lamp further includes a switch, wherein the switch is electrically connected with the circuit board and the light source.

Compared with the prior art, the present disclosure has the following advantages:

The present disclosure provides a rainbow projection lamp, which includes a light-permeable plate, at least one hybrid/monochromatic light source and a circuit board; wherein, at least one arc-shaped through-hole is arranged on the light-permeable plate, and the light source is arranged at one side of the arc-shaped through-hole; and, the light source is electrically connected with the circuit board, and a light emitted by the light source passes through the arc-shaped through-hole and then transmits a rainbow projection. Since wavelengths of different lights are different, and the lights will be diffracted when they pass through a slit, the positions of the diffracted lights will be different when the lights pass through the arc-shaped through-hole of the light-permeable plate. In this way, when colors are separated and projected on a projection background, they can present a variety of colored lights, that is, rich and wonderful rainbow effect. The rainbow projection lamp according to the present disclosure possesses a simple structure, and good rainbow projection effect.

BRIEF DESCRIPTION OF THE DRAWINGS

In order to illustrate the embodiments of the present disclosure or the technical solution in the prior art more clearly, the drawings required in the description of the embodiments or the prior art will be briefly introduced below. Obviously, the drawings in the following description are only some embodiments of the disclosure, and other drawings can be obtained by those skilled in the art without creative works, based on these drawings.

Figure 1:
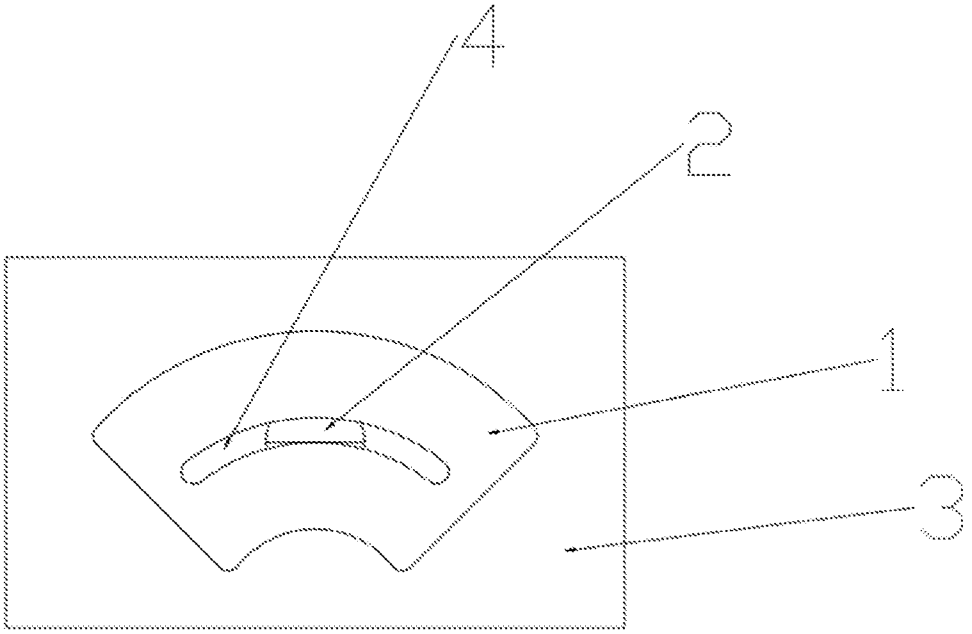
FIG. 1 is a top view of Embodiment 1 of the present disclosure.

Reference numbers: 1—light-permeable plate, 2—light source, 3—circuit board, 4—arc-shaped through-hole, 5—light shielding plate, 6—first cavity, 7—second cavity.

DETAILED DESCRIPTION OF EMBODIMENTS

In the following, the technical solutions in the embodiments of the disclosure will be described clearly and completely in conjunction with the drawings. Obviously, the described embodiments are only a few of the embodiments of this disclosure, but not all of the embodiments. Based on the embodiments of the present disclosure, all other embodiments obtained by those skilled in the art without creative works fall within the protection scope of the present disclosure.

The embodiments of the disclosure disclose a rainbow projection lamp, including a light-permeable plate 1, at least one hybrid/monochromatic light source 2 and a circuit board 3; at least one arc-shaped through-hole 4 is arranged on the light-permeable plate 1, and the light source 2 is arranged at one side of the arc-shaped through-hole 4; and, the light source 2 is electrically connected with the circuit board 3, and a light emitted by the light source 2 passes through the arc-shaped through-hole 4 and then transmits a rainbow projection.

In a preferred embodiment, the rainbow projection lamp further includes a light shielding plate 5; wherein, the light shielding plate 5 is connected with the light-permeable plate 1 to constitute a first cavity 6, and the light source 2 is configured within the first cavity 6.

In a preferred embodiment, the quantity of the light source 2 is one, which is a hybrid light source formed by mixing different colors.

In another preferred embodiment, the quantity of the light sources 2 are multiple, which are monochromatic light sources with different colors or hybrid light sources formed by mixing different colors.

In a preferred embodiment, the light source 2 is an LED lamp bead.

In a preferred embodiment, the quantity of the arc-shaped through-hole 4 is one, and the light source 2 is located at a bottom where the arc-shaped through-hole 4 is located.

In another preferred embodiment, the quantity of the arc-shaped through-holes 4 are multiple, a plurality of light blocking strips for separating each light source 2 are configured within the first cavity 6; the plurality of light blocking strips are configured to separate the first cavity 6 into a plurality of second cavities 7, and the arc-shaped through-holes 4 are arranged on the light-permeable plate 1 corresponding to each of the second cavities 7, respectively. The light blocking strips are configured to prevent light sources with different colors from escaping and mixing in the cavities.

In a preferred embodiment, the rainbow projection lamp further includes a switch, wherein the switch is electrically connected with the circuit board 3 and the light source 2.

Embodiment 1

Figure 2:
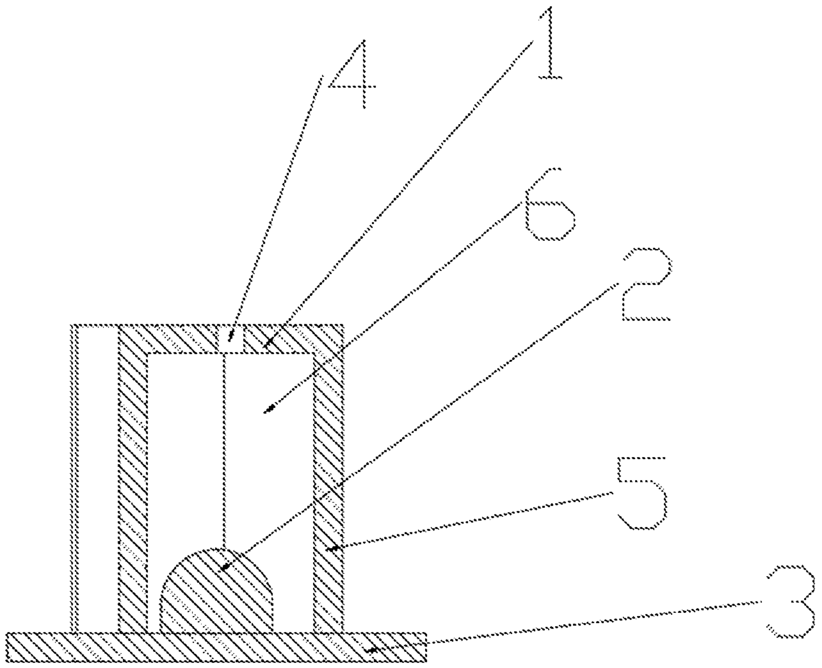
FIG. 2 is a side section view of Embodiment 1 of the present disclosure.
Figure 3:
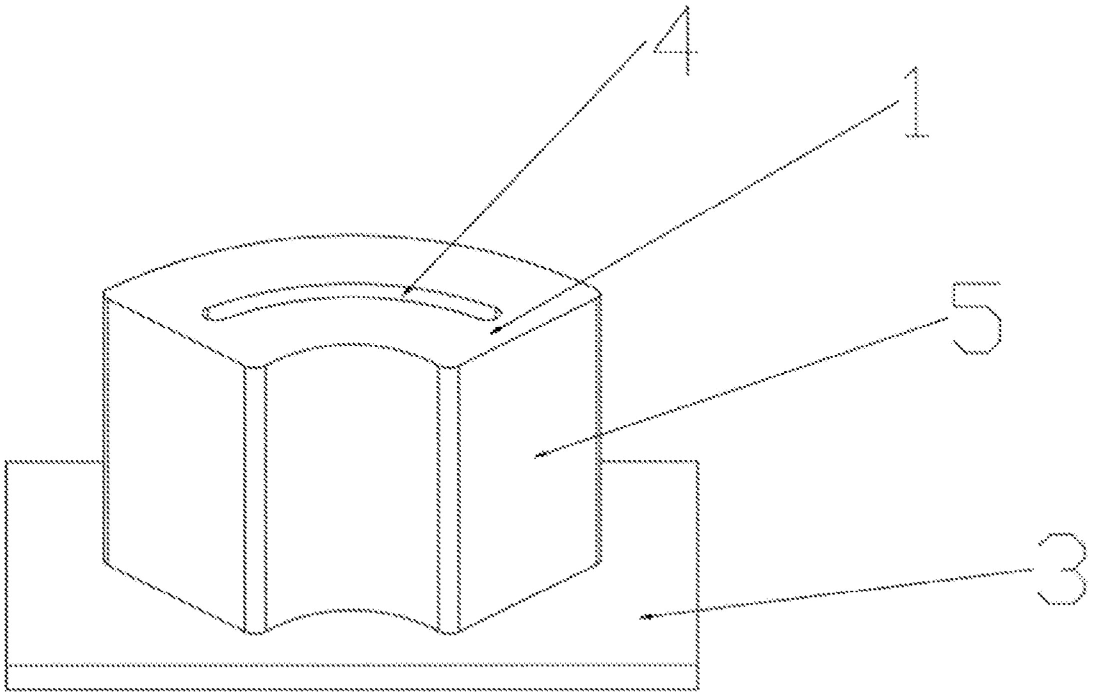
FIG. 3 is a perspective view of Embodiment 1 of the present disclosure.

As shown in FIGS. 1-3, this embodiment includes a light-permeable plate 1, one hybrid light source 2, a circuit board 3, and a switch. The light source 2 is located below the light-permeable plate 1. An arc-shaped through-hole 4 is arranged on the light-permeable plate 1, wherein, the light source 2 may be an RGB three-in-one LED lamp bead, or an LED lamp bead mixed with different colors. Since there is a distance between the light source 2 and the arc-shaped through-hole 4, when the light source 2 emits light, the light can pass through the arc-shaped through-hole 4 and then transmit to a projection background with different distances, so that a rainbow-shaped lighting effect appears on the projection background. Preferably, the light shielding plate 5 is also included, the light shielding plate 5 is connected with the light-permeable plate 1 to constitute a first cavity 6, and the light source 2 is configured within the first cavity 6. The light shielding plate 5 can prevent the light emitted by the light source 2 from going out and affecting the rainbow projection effect.

Furthermore, when the light source 2 is the RGB three-in-one LED lamp bead, there will be red, green and blue spots on the projection background, and the junction of the three color spots can mix colors to produce different effects, so as to obtain a rainbow-like lighting effect.

when the light source 2 is the LED lamp bead mixed with different colors, the color junction projected by the light itself on the projection background can also achieve the effect of color mixing, so as to obtain a rainbow-like lighting effect.

Embodiment 2

Figure 4:
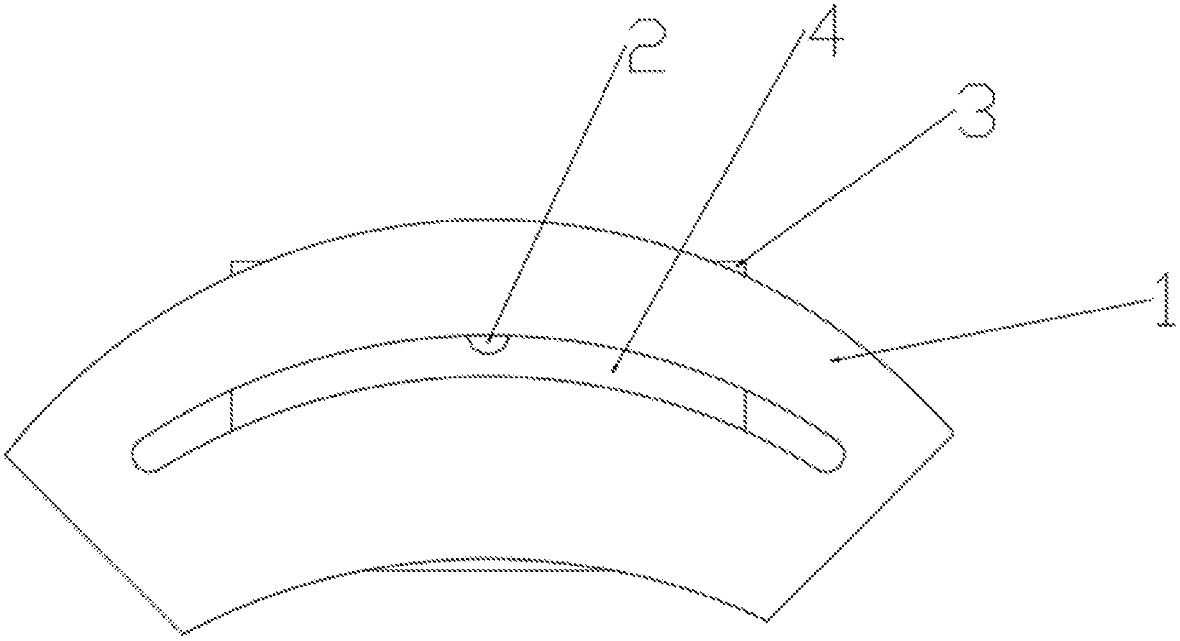
FIG. 4 is a top view of Embodiment 2 of the present disclosure.
Figure 5:
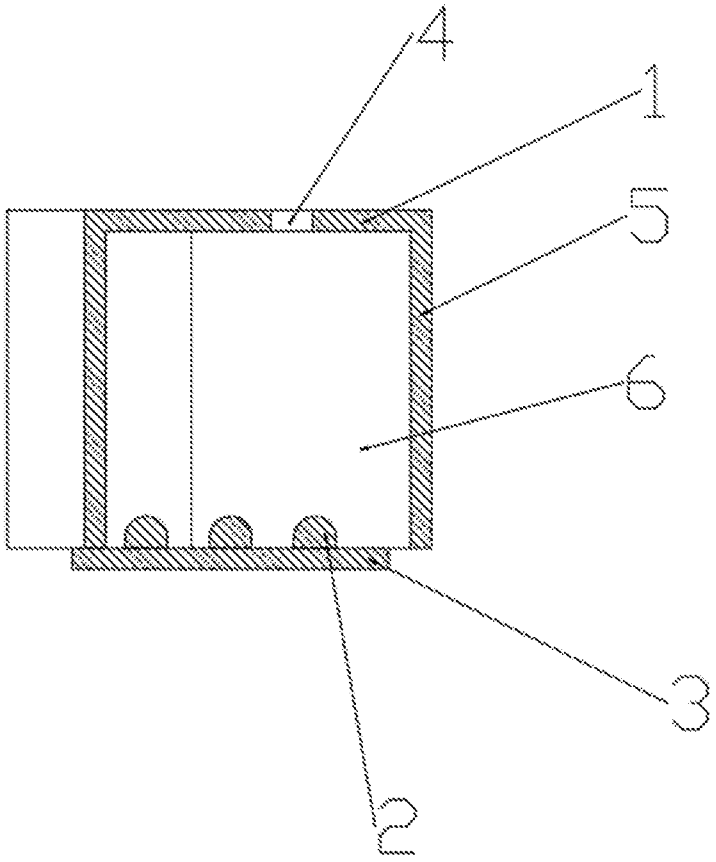
FIG. 5 is a side section view of Embodiment 2 of the present disclosure.
Figure 6:
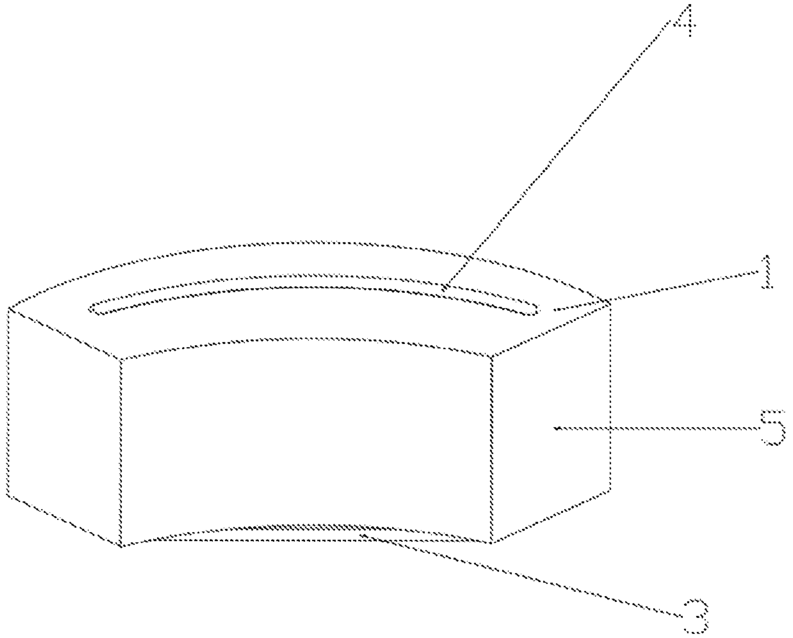
FIG. 6 is a perspective view of Embodiment 2 of the present disclosure.

As shown in FIGS. 4-6, this embodiment includes a light-permeable plate 1, a plurality of hybrid/monochromatic light sources 2, a circuit board 3, and a switch. The light sources 2 are located below the light-permeable plate 1. An arc-shaped through-hole 4 is arranged on the light-permeable plate 1, wherein, the light sources 2 may be monochromatic light sources with different colors or hybrid light sources formed by mixing different colors. Since there is a distance between the light source 2 and the arc-shaped through-hole 4, when the light sources 2 emit light, the light can pass through the arc-shaped through-hole 4 and then transmit to a projection background with different distances, so that a rainbow-shaped lighting effect appears on the projection background. Preferably, the light shielding plate 5 is also included, the light shielding plate 5 is connected with the light-permeable plate 1 to constitute a first cavity 6, and the light source 2 is configured within the first cavity 6. The light shielding plate 5 can prevent the light emitted by the light source 2 from going out and affecting the rainbow projection effect.

When the light sources 2 consist of monochromatic light sources with different colors, or are LED lamp beads mixed with different colors, the color junction projected by the light itself on the projection background can achieve the effect of color mixing and obtain the rainbow-like lighting effect.

Embodiment 3

Figure 7:
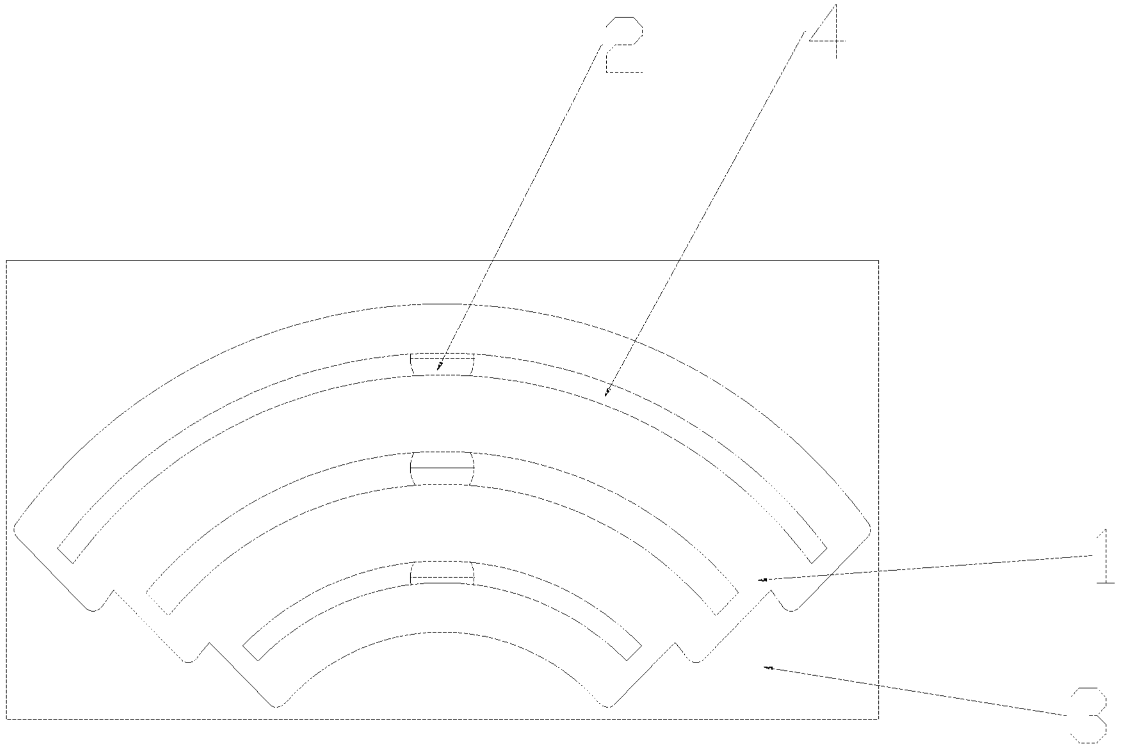
FIG. 7 is a top view of Embodiment 3 of the present disclosure.
Figure 8:
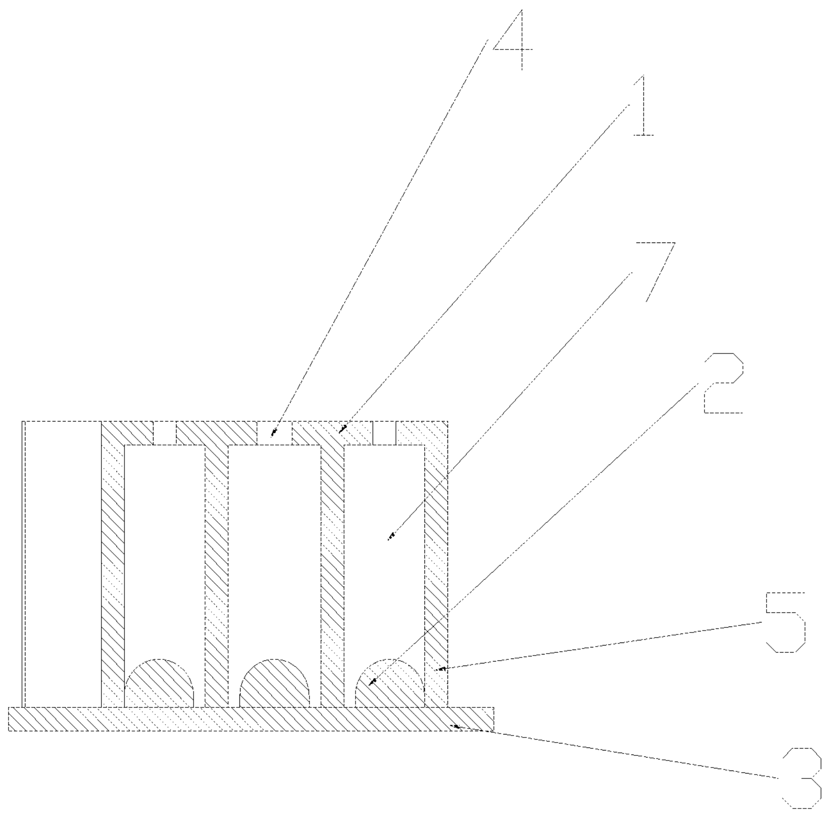
FIG. 8 is a side section view of Embodiment 3 of the present disclosure.
Figure 9:
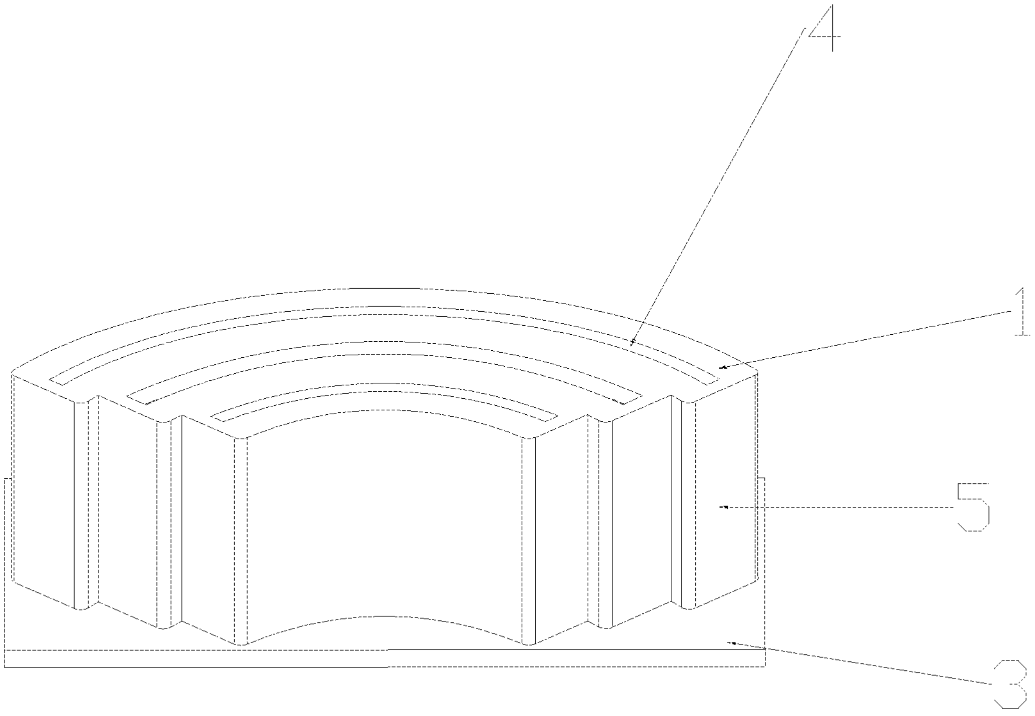
FIG. 9 is a perspective view of Embodiment 3 of the present disclosure.

As shown in FIGS. 7-9, this embodiment includes a light-permeable plate 1, a plurality of light sources 2, a circuit board 3, and a switch. The light sources 2 are located below the light-permeable plate 1. A plurality of arc-shaped through-holes 4 are arranged on the light-permeable plate 1. Additionally, the light shielding plate 5 is also included, the light shielding plate 5 is connected with the light-permeable plate 1 to constitute a first cavity 6, and the light source 2 is configured within the first cavity 6. Preferably, the quantity of the arc-shaped through-holes 4 are multiple. A plurality of light blocking strips for separating each light source 2 are configured within the first cavity 6; the plurality of light blocking strips are configured to separate the first cavity 6 into a plurality of second cavities 7, and the arc-shaped through-holes 4 are arranged on the light-permeable plate 1 corresponding to each of the second cavities 7, respectively. The light blocking strips are configured to prevent light sources with different colors from escaping and mixing in the cavities. Each lamp bead can be projected onto the background with different distances from the corresponding arc-shaped through-hole 4 on the light-permeable plate 1, wherein, the light sources 2 may be monochromatic light sources with different colors or hybrid light sources formed by mixing different colors. Since there is a distance between the light source 2 and the arc-shaped through-hole 4, when the light sources 2 emit light, the light can pass through the arc-shaped through-hole 4 and then transmit to a projection background with different distances, so that a rainbow-shaped lighting effect appears on the projection background.

When the light sources 2 consist of monochromatic light sources with different colors, or are LED lamp beads mixed with different colors, the color junction projected by the light itself on the projection background can achieve the effect of color mixing and obtain the rainbow-like lighting effect.

Working Mechanism:

The switch is started to make the circuit board 3 start working, and the light source 2 electrically connected with the circuit board 3 starts to emit light. When a plurality of lamp beads with different colors or an LED lamp bead mixed with different colors are/is used, due to light source crystals of different color contained in the lamp bead, when the lights of three colors are on at the same time, since wavelengths of different lights are different, and the lights will be diffracted when they pass through slits, the positions of the diffracted lights will be different when the lights pass through the arc-shaped through-holes 4 of the light-permeable plate 1. In this way, when colors are separated and projected on a projection background, they can present a variety of colored lights, that is, rich and wonderful rainbow effect. The rainbow projection lamp according to the present disclosure possesses a simple structure, which is safe and convenient to operate, and has good applicability. Users can choose different rainbow lights according to their own preferences.

In Embodiments 1, 2 and 3, the used light-permeable plate 1 may be a thin plate, which belongs to a usage scenario where the light shielding plate 5 is connected with the light-permeable plate 1 to constitute a first cavity 6, and the light source 2 is configured within the first cavity 6.

Embodiment 4

Figure 10:
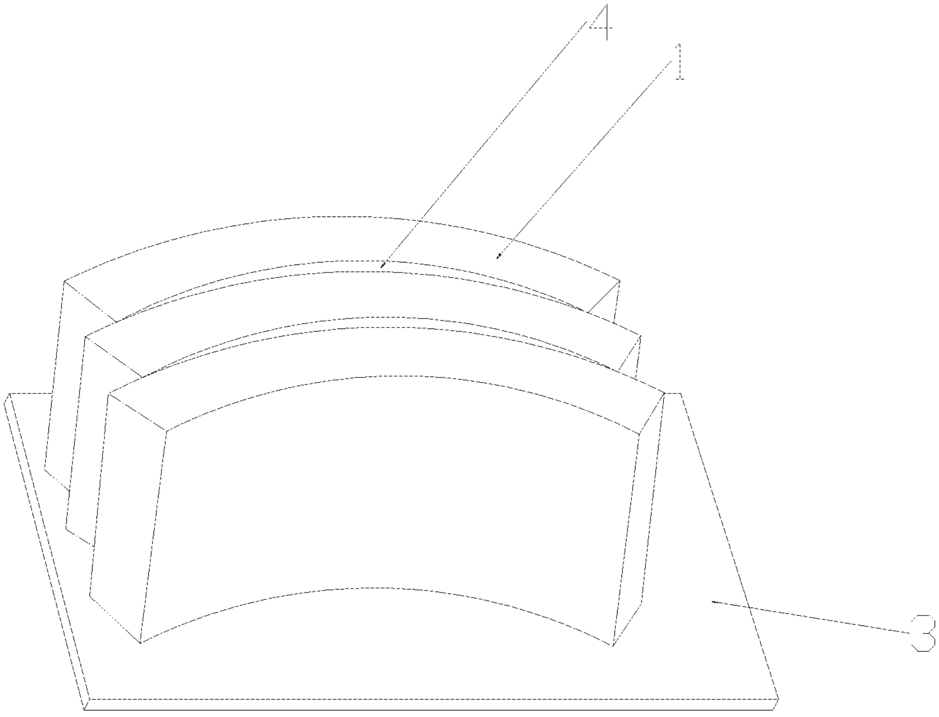
FIG. 10 is a perspective view of Embodiment 4 of the present disclosure.

As shown in FIG. 10, the rainbow projection lamp includes a light-permeable plate 1, at least one hybrid/monochromatic light source 2 and a circuit board 3; at least one arc-shaped through-hole 4 is arranged on the light-permeable plate 1, and the light source 2 is arranged at one side of the arc-shaped through-hole 4; the light source 2 is electrically connected with the circuit board 3, and a light emitted by the light source 2 passes through the arc-shaped through-hole 4 and then transmits a rainbow projection. In this embodiment, the light-permeable plate 1 may be a thick plate, on which at least one arc-shaped through-hole 4 are arranged, so that the light emitted by the light source 2 passes through the arc-shaped through-hole 4, and the rainbow-shaped lighting effect can appear on the projection background.

Although the technology has been described with reference to specific exemplary embodiments, it should be understood that the present disclosure as claimed should not be unduly limited to specific embodiments. In fact, it will be apparent to those skilled in the art that other embodiments and modifications of the present disclosure can be conceived without departing from the true spirit and scope of the present disclosure. It is intended that the appended claims be interpreted to encompass all such embodiments and equivalents.

What is claimed is:

1. A rainbow projection lamp, comprising a light-permeable plate (1), at least one hybrid/monochromatic light source (2) and a circuit board (3);

wherein, at least one arc-shaped through-hole (4) is arranged on the light-permeable plate (1), and the light source (2) is arranged at one side of the arc-shaped through-hole (4); and, the light source (2) is electrically connected with the circuit board (3), and a light emitted by the light source (2) passes through the arc-shaped through-hole (4) and then transmits a rainbow projection;

wherein the quantity of the arc-shaped through-holes (4) are multiple, a plurality of light blocking strips for separating each light source (2) are configured within a first cavity (6); the plurality of light blocking strips are configured to separate the first cavity (6) into a plurality of second cavities (7), and the arc-shaped through-holes (4) are arranged on the light-permeable plate (1) corresponding to each of the second cavities (7), respectively.

2. The rainbow projection lamp according to claim 1, further comprising a light shielding plate (5);

wherein, the light shielding plate (5) is connected with the light-permeable plate (1) to constitute the first cavity (6), and the light source (2) is configured within the first cavity (6).

3. The rainbow projection lamp according to claim 1, wherein the quantity of the light source (2) is one, which is a hybrid light source formed by mixing different colors.

4. The rainbow projection lamp according to claim 1, wherein the quantity of the light sources (2) are multiple, which are monochromatic light sources with different colors or hybrid light sources formed by mixing different colors.

5. The rainbow projection lamp according to claim 3, wherein the light source (2) is an LED lamp bead.

6. The rainbow projection lamp according to claim 3, wherein the quantity of the arc-shaped through-hole (4) is one, and the light source (2) is located at a bottom where the arc-shaped through-hole (4) is located.

7. The rainbow projection lamp according to claim 1, further comprising a switch, wherein the switch is electrically connected with the circuit board (3) and the light source (2).

8. The rainbow projection lamp according to claim 4, wherein the light source (2) is an LED lamp bead.

9. The rainbow projection lamp according to claim 4, wherein the quantity of the arc-shaped through-hole (4) is one, and the light source (2) is located at a bottom where the arc-shaped through-hole (4) is located.

* * * * *